United States Patent [19]
Choi

[11] Patent Number: 5,767,908
[45] Date of Patent: Jun. 16, 1998

[54] ADAPTIVE ORTHOGONAL TRANSFORM CODING APPARATUS

[75] Inventor: Sung-kyu Choi, Seoul, Rep. of Korea

[73] Assignee: Samsung Electronics Co., Ltd., Kyungki-do, Rep. of Korea

[21] Appl. No.: 575,018

[22] Filed: Dec. 19, 1995

[30] Foreign Application Priority Data

Dec. 19, 1994 [KR] Rep. of Korea .................. 94-35128

[51] Int. Cl.⁶ .................................................. H04N 7/12
[52] U.S. Cl. ........................................ 348/403; 348/404
[58] Field of Search ................................ 348/403, 404, 348/405, 407, 409; 382/248, 250; H04N 7/12

[56] References Cited

U.S. PATENT DOCUMENTS

| | | | |
|---|---|---|---|
| 4,691,329 | 9/1987 | Juri et al. | 348/403 |
| 5,107,345 | 4/1992 | Lee | 348/403 |
| 5,144,428 | 9/1992 | Okuda et al. | 348/403 |
| 5,168,357 | 12/1992 | Kutka | 348/403 |
| 5,177,797 | 1/1993 | Takenaka et al. | 348/403 |
| 5,196,930 | 3/1993 | Kadono et al. | 348/403 |
| 5,313,299 | 5/1994 | Ishihara | 348/403 |
| 5,335,016 | 8/1994 | Nakagawa | 348/405 |
| 5,337,049 | 8/1994 | Shimoda | 348/420 |
| 5,351,131 | 9/1994 | Nishino et al. | 348/405 |
| 5,404,168 | 4/1995 | Yamada et al. | 348/405 |
| 5,424,778 | 6/1995 | Sugiyama et al. | 348/403 |
| 5,489,944 | 2/1996 | Jo | 348/405 |
| 5,502,491 | 3/1996 | Sugiyama et al. | 348/403 |
| 5,517,327 | 5/1996 | Nakatani et al. | 348/403 |
| 5,570,199 | 10/1996 | Tanaka et al. | 348/405 |

*Primary Examiner*—Tommy P. Chin
*Assistant Examiner*—Luanne P. Din
*Attorney, Agent, or Firm*—Sughrue, Mion, Zinn, Macpeak & Seas, PLLC

[57] ABSTRACT

An discrete cosine transform (DCT) apparatus is adaptive so as to choose between alternative transform modes for each successive pixel block to be transformed and subsequently variable-length-coded. A first transform device performs a DCT on a subject pixel block. A second transform device performs a DCT on the same subject pixel block of data which has been processed such that the frequency domain transformed data is distributed in a lower frequency compared with the transform coefficients produced by the first transform device. A pair of scanners scan the respective transform coefficients output by the transform devices according to predetermined patterns. A set of four counters accumulate information about the transform coefficients, as scanned by the scanners, so as to indicate the amount of data which would be produced by the respective sets of transform coefficients when variable-length-coded. Based upon the counts produced by the counters, a prediction is made as to which transform mode will produce the least amount of variable-length-code, and the corresponding transform coefficients are selected to be sent to the variable-length-coder.

10 Claims, 3 Drawing Sheets

ADAPTIVE ORTHOGONAL TRANSFORM CODING APPARATUS

BACKGROUND OF THE INVENTION

The present invention relates to an orthogonal transform coding system, and more particularly to an orthogonal transform coding apparatus which can adaptively use one among transform blocks of different sizes according to an amount of motion of an image.

An orthogonal transform coding, which is one of many data compression techniques, uses a transform block of a predetermined size and transforms video data in a spatial domain into transform coefficients in a frequency domain, in which a discrete cosine transform (DCT) is chiefly used. A weight value is usually assigned to this orthogonal-transform-coded data. Then, the orthogonal-transform-coded data weighted with the assigned value is quantized and variable-length-coded. The data compressed in this manner has a variable amount of the data due to the orthogonal transform coding and the variable length coding. For example, in the case of an image having a small amount of motion, the compressed data has a small amount of data, while in the case of an image having a large amount of motion, the compressed data has a large amount of data. Therefore, as the case may be, an amount of the compressed data can be smaller than that of allocated data. Conversely, the amount of the compressed data can be larger than that of allocated data.

When an amount of the compressed data is larger than that of the allocated data, and the compressed data is transmitted or recorded by a digital VCR, a loss of the data can occur. Such a data loss affects an image to be reproduced and provides a factor which degenerates a quality of picture. A conventional coding system for minimizing a data loss which occurs when an amount of the compressed data is larger than that of the allocated data, will be described below referring to FIG. 1.

A mode selector 11 of FIG. 1 analyzes input video data in a spatial domain and judges motion of an image between fields or frames. Mode selector 11 selects one between an 8×8 mode and a 4×8 mode according to motion of the judged image. An amount of data due to compression of a video signal becomes larger in case of a large amount of the image motion than in case of a small amount of the image motion. Based on such a fact, mode selector 11 predicts an amount of the compressed data through the judgement of the image motion and selects a transform mode which brings a minimal data loss. In case of the image having a small amount of motion, an 8×8 mode using a transform block of an 8×8 size is selected, while in case of the image having a large amount of motion, a 4×8 mode using a transform block of a 4×8 size is selected. When the 8×8 mode selected, mode selector 11 outputs the input video data in the form of an 8×8 pixel block to an 8×8 DCT unit 13. The 8×8 DCT unit 13 transforms the video data applied from mode selector 11 into data of a frequency domain, using the 8×8 sized transform block. When the 4×8 mode selected, mode selector 11 generates a summation signal SUM and a difference signal DIFF of corresponding pixels between fields or frames. In more detail, mode selector 11 sums pixel values of columns corresponding to odd and even rows of an 8×8 pixel blocks in a spatial domain, and generates summation signal SUM representing a 4×8 pixel block, while mode selector 11 obtains differences between pixel values of columns corresponding to odd and even rows thereof and generates difference signal DIFF representing a 4×8 pixel block. The summation signal SUM is supplied to 4×8 DCT unit 14 and the difference signal DIFF is supplied to 4×8 DCT unit 15. The 4×8 DCT units 14 and 15 use transform blocks of 4 (vertical)×8 (horizontal) sizes and transforms the input video data into data of a frequency domain. Coefficient values distributed in a high frequency domain move to a low frequency domain by 4×8 DCT unit 14 and 15.

The orthogonally transformed data output from the FIG. 1 apparatus is scanned from a DC coefficient to a high frequency transform coefficient according to a zigzag scan pattern. A coding system having the FIG. 1 apparatus discards data starting from the highest frequency portion of the orthogonally transformed data when an amount of the compressed data is larger than that of the allocated data. The priority discarding the data is based on the human visual characteristic which is more sensitive to a video signal of the low frequency than that of the high frequency. Thus, a data loss can be minimized so that a quality of the image can be enhanced during reproducing.

The above-described FIG. 1 apparatus selects, however, one between the 8×8 mode and the 4×8 mode, on the basis of not the data in the frequency domain where a variable length coding is actually processed, but the data in a spatial domain prior to orthogonally transforming. Thus, an accuracy with respect to prediction of an amount of the data generated by compression is lowered.

SUMMARY OF THE INVENTION

Therefore, to solve the above problems, it is an object of the present invention to provide an adaptive orthogonal transform coding apparatus which can predict variable-length-coded data based on data in a frequency domain and adaptively select a different orthogonal transform mode according to a prediction result.

Thus, to accomplish the above object of the present invention, there is provided an adaptive orthogonal transform coding apparatus which orthogonally transforms video data in a spatial domain and variable-length-codes transform coefficients generated by the orthogonal transform, the adaptive orthogonal transform coding apparatus comprising:

first orthogonal transform means for orthogonally transforming the video data in units of a pixel block of a size of M×N where the M and N are integers which represent the number of the vertical lines or columns and the number of the horizontal lines or rows, respectively;

second orthogonal transform means for receiving video data which is same as that of the first orthogonal transform means, processing the input video data so that transform coefficients are highly distributed in the low frequency compared with that of the first orthogonal transform means, and orthogonally transforming the processed video data in units of the pixel block;

first scan means for receiving the transform coefficients generated by the first orthogonal transform means and scanning and outputting the transform coefficients corresponding to individual pixel blocks according to a predetermined first scan sequence;

second scan means for receiving the transform coefficients generated by the second orthogonal transform means and scanning and outputting the transform coefficients corresponding to individual pixel blocks according to a predetermined second scan sequence;

selective output means for selectively outputting the transform coefficients from the first and second scan means according to a mode select signal; and control means for respectively predicting an amount of data obtained by variable-length-coding the transform coefficients output from the first scan means and an amount of data obtained by variable-length-coding the transform coefficients output from the second scan means, with respect to the pixel blocks, and generating the mode select signal representing an orthogonal transform mode selected in correspondence to the individual pixel block on the basis of the predicted data amounts.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the accompanying drawings.

Figure 1:
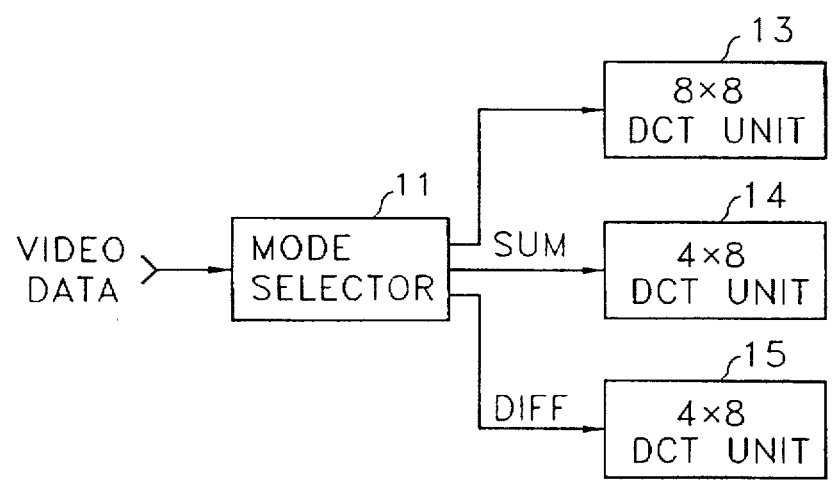
FIG. 1 is a block diagram representing a conventional orthogonal transform coding apparatus which has been used in a coding system to minimize a data loss.
Figure 2:
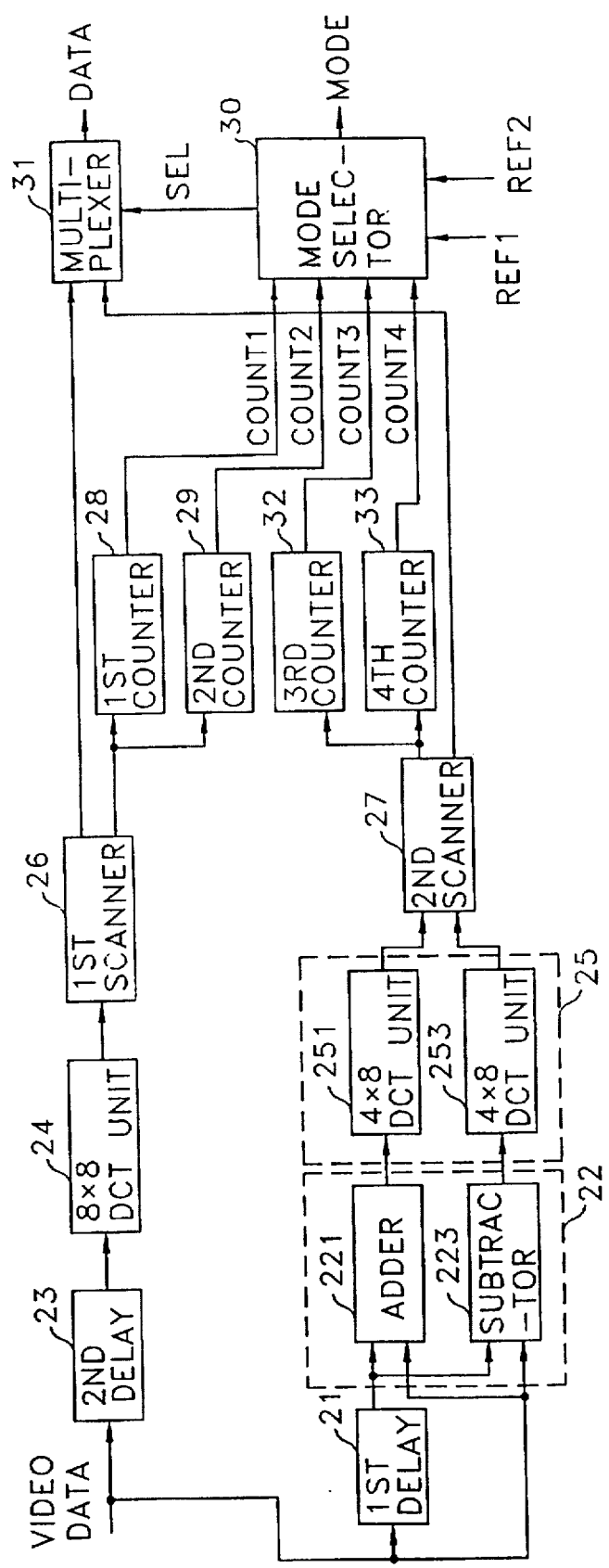
FIG. 2 is a block diagram representing an adaptive orthogonal transform coding apparatus according to a preferred embodiment of the present invention.

FIG. 2 is a block diagram representing an adaptive orthogonal transform coding apparatus according to a preferred embodiment of the present invention. The FIG. 2 apparatus orthogonally transforms pixel blocks of the 8×8 sizes represented in a spatial domain according to an 8×8 transform mode which performs a DCT operation using a transform block of an 8×8 size and a 4×8 transform mode which performs a DCT operation using two transform blocks of 4×8 sizes. A second delay 23 and an 8×8 DCT unit 24 shown in FIG. 2 are used for performing an 8×8 transform mode. A first delay 21, an operator 22 and a 4×8 DCT unit 25 shown in FIG. 2 are used for performing a 4×8 transform mode. The 4×8 transform mode plays a role of moving a high frequency component of the video signal contained in a pixel block of the 8×8 size represented in the spatial domain to a low frequency domain. The data output from first scanner 26 is supplied to a multiplexer 31 and first and second counters 28 and 29. The data output from second scanner 27 is supplied to multiplexer 31 and third and fourth counters 32 and 33. Mode selector 30 determines a specific transform mode based on counter values COUNT1 and COUNT3 applied from first and third counters 28 and 32 and a first reference value REF1. When the specific transform mode is not determined, mode selector 30 finally determines a specific transform mode based on counter values COUNT2 and COUNT4 applied from second and fourth counters 29 and 33 and a second reference value REF2. A select signal SEL representing the determined transform mode is supplied to multiplexer 31. The detailed construction and operation of the FIG. 2 apparatus will be described below with reference to FIGS. 3A, 3B and 3C.

The video data input in the FIG. 2 apparatus is data which is segmented in a pixel block of the 8×8 size. Therefore, the video data is input in the 8×8 sized pixel block from a pixel of a first row and a first column in the pixel block to a pixel of the last row and the last column therein, in sequence. The video data input in the FIG. 2 apparatus is supplied to first delay 21, operator 22 and second delay 23. First delay 21 delays the input video data by a time corresponding to one row of the 8×8 pixel block and outputs the delayed video data. Operator 22 receives the delayed video data and the undelayed video data, and calculates summation and difference of the pixel values which are placed in a column corresponding to contiguous odd row and even row in the pixel block for every 8×8 pixel block, and outputs the calculated values. The operator 22 comprises an adder 221 for calculating a summation of the corresponding pixel values and a subtractor 223 for calculating a difference of the corresponding pixel values. Adder 221 calculates the summation of the corresponding pixel values in the 8×8 pixel block to produce a 4 (row)×8 (column) pixel block, and outputs the video data of the pixel block to 4×8 DCT unit 25. Subtractor 223 calculates the difference of the corresponding pixel values in the 8×8 pixel block to produce a 4 (row)×8 (column) pixel block, and outputs the video data of the pixel block to 4×8 DCT unit 25.

The 4×8 DCT unit 25 comprises a summation DCT unit 251 and a difference DCT unit 253. The video data output from adder 221 is applied to summation DCT unit 251, and the video data output from subtractor 223 is applied to difference DCT unit 253. Summation DCT unit 251 orthogonally transforms the input video data into the data in the frequency domain, that is, transform coefficients, using a transform block of a 4×8 size. Difference DCT unit 253 orthogonally transforms the input video data into the data in the frequency domain, that is, transform coefficients, using the transform block of the 4×8 size. The transform coefficients (or frequency domain data) produced by 4×8 DCT unit 25 are supplied to a second scanner 27 to be described later.

Figure 3A:
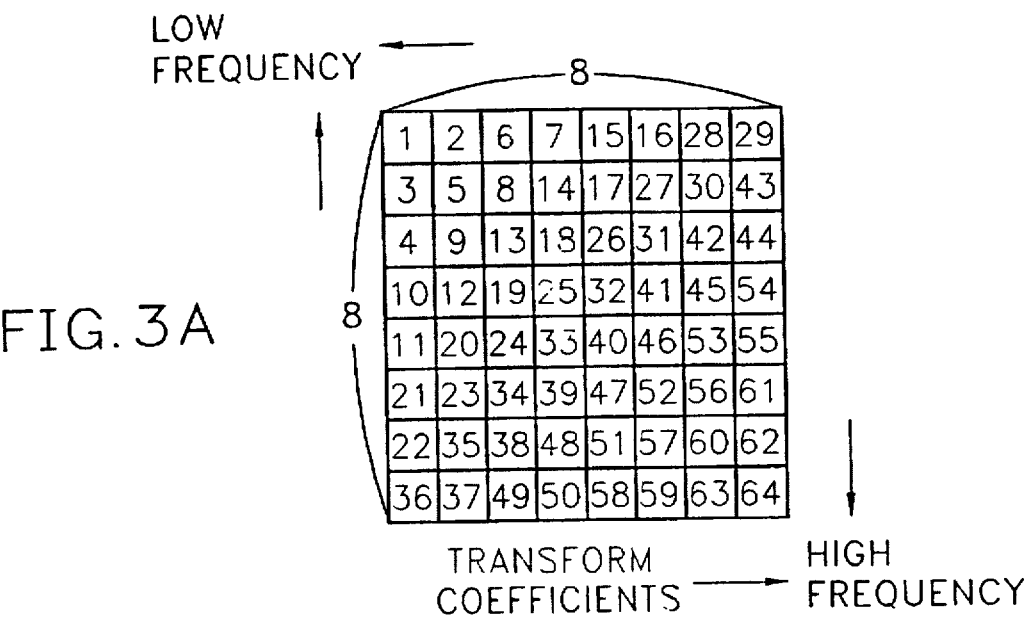
FIG. 3A is a conceptual diagram for explaining a scan sequence with respect to an 8×8 sized block.
Figure 3B:
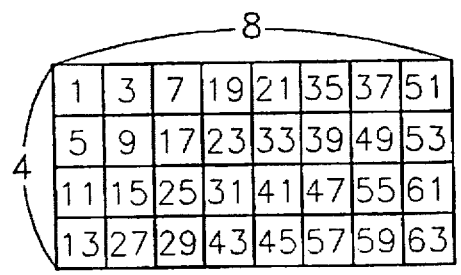
FIGS. 3B and 3C are conceptual diagrams for explaining a scan sequence with respect to 4×8 sized blocks.
Figure 3C:
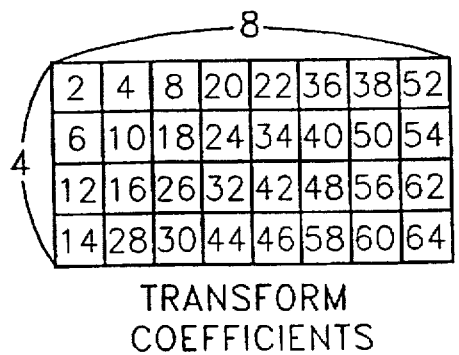

Meanwhile, second delay 23 delays the video data input from an external source to the FIG. 2 apparatus and outputs the delayed video data, so that a point of time when video data is supplied from operator 22 to 4×8 DCT unit 25 is same as that when the same video data is supplied to 8×8 DCT unit 24 via second delay 23. The second delay 23 synchronizes the data supplied to 8×8 DCT unit 24 with the data supplied to 4×8 DCT unit 25. The 8×8 DCT unit 24 orthogonally transforms the video data supplied from second delay 23 in units of a pixel block of an 8×8 size, and the transform coefficients of the frequency domain produced by the orthogonal transform are output to first scanner 26. First scanner 26 scans the 8×8 sized block having the transform coefficients output from 8×8 DCT unit 24 according to a scan method shown in FIG. 3A. Second scanner 27 scans the 4×8 sized block having the transform coefficients output from summation DCT unit 251 and the 4×8 sized block having the transform coefficients output from difference DCT unit 253 according to scan methods shown in FIGS. 3B and 3C, respectively. FIGS. 3A through 3C show scan sequences with respect to a two-dimensional frequency domain. In the two-dimensional domain respectively shown in FIGS. 3A through 3C, the vertical axes have the higher frequency values downwards, and the horizontal axes have the higher frequency values rightwards. The figures shown in FIGS. 3A through 3C represent the scan sequences according to a zig-zag scan method, in which the scan operation is performed from a smaller figure to a larger figure. Thus, first scanner 26 outputs corresponding transform coefficients in sequence of the figures shown in FIG. 3A. Second scanner 27 outputs corresponding transform coefficients in sequence of the figures shown in FIGS. 3B and 3C. Therefore, second scanner 27 outputs the transform coefficients by the orthogonal transform of the summation and those by the orthogonal transform of the subtraction, alternately.

The transform coefficients output from first scanner 26 are simultaneously supplied to first and second counters 28 and 29. The transform coefficients output from second scanner 27 are simultaneously supplied to third and fourth counters 32 and 33. It is desirable that first scanner 26 delays the transform coefficients supplied to first and second counters 28 and 29 by a predetermined time and supplies the delayed transform coefficients to a multiplexer 31. It is desirable that second scanner 27 delays the transform coefficients supplied to third and fourth counters 32 and 33 by a predetermined time and supplies the delayed transform coefficients to multiplexer 31. Through such signal delays of first and second scanners 26 and 27, data of the very block which is used for production of the counter values for determination of the transform mode is selected by multiplexer 31 and the selected data is output to an apparatus (not shown).

First and second counters 28 and 29 count the transform coefficients belonging to the block of the 8×8 size supplied from first scanner 26. Third and fourth counters 32 and 33 count the transform coefficients belonging to the block of the 8×8 size supplied from second scanner 27. Particularly, counters 28, 29, 32 and 33 are designed so that first and third counters 28 and 32 count the number of the values of "zeros" among the transform coefficients by the orthogonal transform of each of 8×8 pixel blocks, and second and fourth counters 29 and 33 count the number of times where the value of the "zero" are changed to a value of a non-zero in the transform coefficients. Counters 28, 29, 32 and 33 are also designed so that they output the respective count values COUNT1, COUNT2, COUNT3 and COUNT4 in units of the blocks of the 8×8 size to be simultaneously initialized. Thus, the count values COUNT1 and COUNT3 output from first and third counters 28 and 32 respectively represent the number of "zeros" belonging to individually corresponding 8×8 size block, and the count values COUNT2 and COUNT4 output from second and fourth counters 29 and 33 respectively represent how many the values of "zeros" belonging to individually corresponding blocks of the 8×8 size are sequentially arranged. The count values output from counters 28, 29, 32 and 33 are supplied to mode selector 30. Mode selector 30 selects a transform mode with respect to the pixel blocks of the 8×8 size on the basis of the applied count values. The mode selector 30 selects a specific transform mode on the basis of comparison of reference values REF1 and REF2 with input count values COUNT1, COUNT2, COUNT3 and COUNT4, and generates a select signal SEL representing the selected transform mode. Reference values REF1 and REF2 used in mode selector 30 are experimentally determined and are established as optimal values so that an amount of the compressed data generated by the orthogonal transform and the variable-length-coding does not exceed an amount of the allocated data. A procedure of generating select signal SEL in mode selector 30 will be described below in more detail.

Mode selector 30 selects an optimal orthogonal transform mode using the count values COUNT1, COUNT2, COUNT3 and COUNT4. The mode selector 30 compares the count values COUNT1 and COUNT3 with first reference value REF1. When one of count values COUNT1 and COUNT3 is larger than first reference value REF1 and the other thereof is smaller than first reference value REF1 in the result of the comparison, mode selector 30 selects a transform mode corresponding to the count value larger than first reference value REF1. For example, when only the count value COUNT3 is larger than first reference value REF1, a 4×8 transform mode is selected. Meanwhile, when both of count values COUNT1 and COUNT3 are larger than or smaller than first reference value REF1 in the result of the comparison, mode selector 30 compares count values COUNT2 and COUNT4 with second reference REF2. When one of count values COUNT2 and COUNT4 is larger than second reference value REF2 and the other thereof is smaller than second reference value REF2 in the result of the comparison, mode selector 30 selects a transform mode corresponding to the count value smaller than second reference value REF2. For example, when only the count value COUNT1 is smaller than second reference value REF2, an 8×8 transform mode is selected. When both count values COUNT2 and COUNT4 are larger or smaller than second reference value REF2, mode selector 30 selects the 8×8 transform mode. Mode selector 30 generates select signal SEL and mode signal MODE representing the selected transform mode, the generated select signal SEL is supplied to multiplexer 31. Multiplexer 31 selects the data supplied from first and second scanners 26 and 27 in units of the 8×8 pixel block according to input select signal SEL. As described above, scanners 26 and 27 delay the data of the block used for the production of the count values for determination of the transform mode and output the delayed data. Therefore, multiplexer 31 selects the transform coefficients belonging to the same block as that used for generation of the select signal and the selected data is supplied to a variable-length-coder (not shown) and variable-length-coded.

The present invention is not limited to the above-described embodiment apparatus in which the transform coefficients of the specific mode belonging to the same block as that used for the generation of the select signal are selected and the selected transform coefficients are supplied to the variable-length-coder.

As described above, the present invention analyzes the orthogonally transformed data and selects the optimal orthogonal transform mode. Particularly, the present invention selects the orthogonal transform mode on the basis of the number of succeeding "zeros" which exist in the data by the orthogonal transform for every pixel block of the 8×8 size, and the number of times of changing from the "zero" to the "non-zero". Therefore, the optimal orthogonal transform mode is selected on the basis of more accurate prediction of an amount of the data to be generated by the rear-end variable-length-coder. Accordingly, compared with a case where a orthogonal transform mode is selected on the basis of the data analysis of the spatial domain, a problem that a quality of picture is lowered due to the incorrect mode selection can be effectively solved.

While only certain embodiments of the invention have been specifically described herein, it will apparent that numerous modifications may be made thereto without departing from the spirit and scope of the invention.

What is claimed is:

1. An adaptive orthogonal transform coding apparatus which orthogonally transforms video data in a spatial domain, said adaptive orthogonal transform coding apparatus comprising:

first orthogonal transform means for orthogonally transforming the video data in units of a subject pixel block of a size of M×N where N is an integer which represents the number of columns and M is an integer which represents the number of rows, respectively, to produce first transform coefficients;

second orthogonal transform means, receiving the video data, for processing the input video data to redistribute the spectral placement thereof and orthogonally transforming the processed video data in units of the pixel block, to produce second transform coefficients having a greater low frequency distribution than said first transform coefficients;

first scan means, receiving said first transform coefficients, for scanning and outputting the first transform coefficients corresponding to individual units of the pixel block according to a predetermined first scan sequence;

second scan means, receiving said second transform coefficients, for scanning and outputting the second transform coefficients corresponding to individual units of the pixel block according to a predetermined second scan sequence;

selective output means for selectively outputting the transform coefficients from said first and second scan means according to a mode select signal; and control means for respectively predicting a first amount of data obtained by variable-length-coding the first transform coefficients output from said first scan means and a second amount of data obtained by variable-length-coding the second transform coefficients output from said second scan means, with respect to said subject pixel block, and generating said mode select signal representing an orthogonal transform mode selected in correspondence to said subject pixel block on the basis of the predicted first amount of data and second amount of data.

2. The adaptive orthogonal transform coding apparatus according to claim 1, wherein said first and second orthogonal transform means each function to discrete-cosine-transform the input video data.

3. The adaptive orthogonal transform coding apparatus according to claim 1, wherein said second orthogonal transform means comprises:

block formation means for calculating summation and difference of pixel values of the same column as contiguous corresponding odd and even rows which exist in the subject pixel block composed of M×N pixels, and forming a first (M/2)×N pixel block composed of pixels resulting from the summation calculation and a second (M/2)×N pixel block composed of pixels resulting from the difference calculation;

a summation block orthogonal transformer for orthogonally transforming the data of the first (M/2)×N pixel block formed by said block formation means, to produce summation transform coefficients; and a difference block orthogonal transformer for orthogonally transforming the data of the second (M/2)×N pixel block formed by said block formation means, to produce difference transform coefficients.

4. The adaptive orthogonal transform coding apparatus according to claim 3, wherein said second scan means scans the summation transform coefficients alternately with the difference transform coefficients, and outputs the scanned result.

5. The adaptive orthogonal transform coding apparatus according to claim 3, further comprising delay means for delaying the input video data application to said first orthogonal transform means to be synchronized with a point of time when the data formed by said block formation means is applied to said summation orthogonal transformer and said difference orthogonal transformer.

6. The adaptive orthogonal transform coding apparatus according to claim 1, wherein said first and second scan means scan the transform coefficients in sequence from a low frequency to a high frequency, respectively.

7. The adaptive orthogonal transform coding apparatus according to claim 1, wherein said control means comprises:

a first counter for counting the transform coefficients of which the value is "zero" among the transform coefficients output from said first scan means and outputting a first count value representing the counting result, with respect to the subject pixel block;

a second counter for counting the transform coefficients of which the value is "zero" among the transform coefficients output from said second scan means and outputting a second count value representing the counting result, with respect to the subject pixel block; and a mode selector for individually comparing a predetermined first reference value with said first and second count values, and generating the mode select signal according to the comparison result.

8. The adaptive orthogonal transform coding apparatus according to claim 7, wherein said mode selector selects an orthogonal transform mode corresponding to a count value larger than the first reference value when one of said first and second count values is larger than the first reference value and the other thereof is smaller than the first reference value.

9. The adaptive orthogonal transform coding apparatus according to claim 8, wherein said control means further comprises:

a third counter for counting the number of times where the transform coefficient value of "zero" is changed into that of "non-zero" among the transform coefficients output from said first scan means and generating a third count value representing the count result, with respect to the subject pixel block; and a fourth counter for counting the number of times where the transform coefficient value of "zero" is changed into that of "non-zero" among the transform coefficients output from said second scan means and generating a fourth count value representing the count result, with respect to the subject pixel block, wherein said mode selector individually compares a predetermined second reference value with said third and fourth count values when both of said first and second count values are larger or smaller than said first reference value and generates the mode select signal according to the comparison result.

10. The adaptive orthogonal transform coding apparatus according to claim 9, wherein, when both said first and second count values are either larger or smaller than said first reference value, said mode selector selects an orthogonal transform mode corresponding to a count value smaller than the second reference value when one of said third and fourth count values is larger than the second reference value and the other thereof is smaller than the second reference value, and generates the mode select signal for selecting the first transform coefficients generated by said first orthogonal transform means when both of said third and fourth count values are larger or smaller than said second reference value.

* * * * *